(12) United States Patent
Huang et al.

(10) Patent No.: US 6,789,461 B1
(45) Date of Patent: Sep. 14, 2004

(54) WATER LEVEL DETECTING DEVICE FOR A PERCOLATOR

(76) Inventors: Chuan-Pan Huang, P.O. Box 2-10, Tainan City (TW); Chen-Lung Huang, P.O. Box 2-10, Tainan City (TW)

( * ) Notice: Subject to any disclaimer, the term of this patent is extended or adjusted under 35 U.S.C. 154(b) by 0 days.

(21) Appl. No.: 10/783,105

(22) Filed: Feb. 16, 2004

(51) Int. Cl.[7] ............. A23L 1/00; A47J 27/21; A47J 37/12; A47J 31/00; H05B 1/00
(52) U.S. Cl. ............. 99/331; 99/281; 99/337; 219/441; 219/437
(58) Field of Search ............. 99/326–333, 337, 99/338, 403–410, 279–282, 323.3, 275; 219/441, 401, 437, 438, 518, 442, 429, 432; 392/447, 498

(56) References Cited

U.S. PATENT DOCUMENTS

| | | | |
|---|---|---|---|
| 4,715,269 A | * 12/1987 | Stoner | 99/279 |
| 4,982,654 A | * 1/1991 | Bourgeois | 99/323.3 |
| 5,285,717 A | * 2/1994 | Knepler | 99/282 |
| 5,722,314 A | * 3/1998 | Nakano et al. | 99/331 |
| 5,727,448 A | * 3/1998 | Sa | 99/331 |
| 5,841,108 A | * 11/1998 | Lacombe | 219/441 |
| 6,135,012 A | * 10/2000 | Kao | 99/331 |
| 6,172,341 B1 | * 1/2001 | Hoffmann et al. | 219/441 |
| 6,279,459 B1 | * 8/2001 | Mork et al. | 99/281 |
| 6,347,576 B1 | * 2/2002 | Chung | 99/331 |
| 6,431,058 B1 | * 8/2002 | Binot et al. | 99/331 |
| 6,505,545 B2 | * 1/2003 | Kennedy et al. | 99/331 |
| 6,742,444 B1 | * 6/2004 | Lai et al. | 99/330 |

* cited by examiner

Primary Examiner—Timothy F. Simone

(57) ABSTRACT

A water level detecting device for a percolator includes a pot body having a coffee powder container provided on the topside and a buoy device installed in the interior. The buoy device consists of a buoy rod fitted thereon with a buoy. A detecting device (a magnetic induction element or a photo-electric element) is provided on a power base or on the outer wall of the pot body or in the buoy rod. The buoy is able to move upward and downward together with the height of the water level of a water tank of the pot body. When the water level of the water reservoir reaches a lowermost limit preset, the detecting device will interact with the buoy to cut off power of the heater of the pot body, enabling the percolator to cut off electricity automatically to enhance safety in use.

11 Claims, 7 Drawing Sheets

WATER LEVEL DETECTING DEVICE FOR A PERCOLATOR

FIELD OF THE INVENTION

This invention relates to a water level detecting device for a percolator, particularly to one provided in a pot body with a buoy able to move upward and downward together with the height of the water level of the water reservoir of the pot body. When the water level reaches a lowermost limit preset, the water level detecting device will properly interact with the buoy to disconnect the electric source of the heater of the pot body, enabling the percolator to cut off electricity automatically to enhance safety in use.

BACKGROUND OF THE INVENTION

A first conventional percolator disclosed in a Taiwan patent of No. 168846 includes a water container, a loading funnel, and a pot and a lid.

The water container has its upper outer wall formed with male threads and its upper inner edge formed with an engage edge.

The loading funnel positioned in the water container is formed with a projecting edge at the upper end, and provided with a tube at the lower side. The loading funnel is positioned in the interior of the container having a holding disk bored with numerous filtering pores.

The pot assembled on the water container has its bottom formed with a recessed chamber, which has its inner wall provided with female threads. The pot is further provided in the intermediate portion with a duct passing through the recessed chamber and having slots in the upper side, and the recessed chamber is provided inside with a filter screen and a washer. The lid is covered on the pot.

After the water container is filled with water, and coffee powder is filled in the holding disk inside the loading funnel and the pot is threadably combined with the water container, the water container has its lower side heated to boil the water inside. When the water in the water container boils, pressure produced in the water container will force the boiling water into the loading funnel to mix with the coffee powder in the holding disk through the siphon tube under the loading funnel. Then, the boiling water mixed with the coffee powder is filtered by the filter screen in the recessed chamber of the pot, and the coffee liquid is led by the duct of the pot to flow into the pot through the upper slots of the duct, thus obtaining aromatic coffee. In general, the first conventional percolator is small in size, convenient to be carried about, and easy to be disassembled for cleaning.

A second conventional percolator disclosed in a Taiwan patent of No. 134874, includes a glass pot, a potholder and a sensing device.

The glass pot has its lower side threadably assembled with a heating disk having its circumferential edge provided with an annular projecting edge extending downward.

The potholder has its upper base protrusively provided with a plurality of heat-insulating rings spaced apart properly. Each heat-dispersing ring is bored with a plurality of heat-radiating holes spaced apart. An arc-surfaced heat-insulating plate is positioned above the heat-insulating rings and an electric heating disk is fixed on the heat-insulating plate, having at least one electric heating tube controlled by a driving circuit. The electric heating disk has its lower side connected with a first sensing unit for sensing the temperature of the electric heating disk. Further, the upper base of the potholder is provided inside with a fixing plate for positioning the electric heating disk.

Further, a second sensing unit is provided for sensing the temperature of water in the pot so as to maintain the original taste of coffee brewed in the pot.

A third conventional percolator disclosed in a Taiwan patent of No. 114331, includes a heat-conducting disk, a water-stopping annular plate, a metal fixing disk, an electric heating switch, an overheat protection device and an electric indicating lamp.

The heat-conducting disk has a U-shaped heating ring provided inside and two electric studs extending downward from the lower side. Further, the heat-conducting disk has its center and its tri-sectioned circumferential edge respectively provided with a stud with a fixing threaded hole, and beside the central fixing threaded hole is provided a power adjusting entrance terminal of a stud shape with a threaded hole.

The metal fixing disk is bored with fixing holes, wide holes and annular holes for matching with the fixing threaded holes of the heat-conducting disk. In assembling, the heat-conducting disk is assembled on the lower side of a pot by means of the water stopping annular plate. So the heat conducting disk has its surface closely contacting with the circumferential surface of an assembly hole, and the threaded holes under its bottom pass through the assembly hole respectively facing the fixing holes of the fixing disk so that the electric heating switch and the overheat protection device can be fixed on both the fixing disk and the heat conducting disk.

A fourth conventional percolator shown in FIG. 1 includes a pot body 1 provided with a coffee powder container 10 on the topside and a heater 12 on the bottom wall 11. When the heater 12 is powered, it begins to boil the water in the water reservoir of the pot body for brewing coffee.

The conventional percolators described above all have the water levels of their water tank able to be checks by a user's eyes. Under the circumstances, if the water level of the water tank reaches a lowermost limit or the water therein is dried up, but the user should not pay attention to the situation, the percolator might be burned idly, liable to cause danger.

SUMMARY OF THE INVENTION

The objective of the invention is to offer a water level detecting device for a percolator, provided with an electric heating sensing device able to detect the water level of the percolator and enable an electric heating film to be cut off electrically and automatically.

The features of the invention are described as follows.

1. The water level detecting device for a percolator in the present invention includes a pot body and a detecting device. The pot body is provided with a coffee powder container on the topside and a buoy device in the interior. The buoy device consists of a buoy rod fitted thereon with a buoy. The detecting device (a magnetic induction element or a photoelectric element) is provided on a power base or on the outer wall of the pot body or in the buoy rod. The buoy in the pot body will move upward or downward together with the height of the water level of a water tank. When the water level of the water tank reaches a lowermost limit preset, the detecting device will properly interact with the buoy to disconnect the power of the heater of the pot body, enabling the percolator to cut off electricity automatically.

2. The buoy of the pot body is provided with a magnetic member.
3. The buoy rod of the pot body is provided inside with a receiving element or emitting element of a photoelectric element.
4. The magnetic induction element of the detecting device is a magnetic reed switch or a HALL IC.
5. The photoelectric element of the detecting device is a ultra-red ray emitting/receiving element or a light sensitive resistor or a photoelectric transistor.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
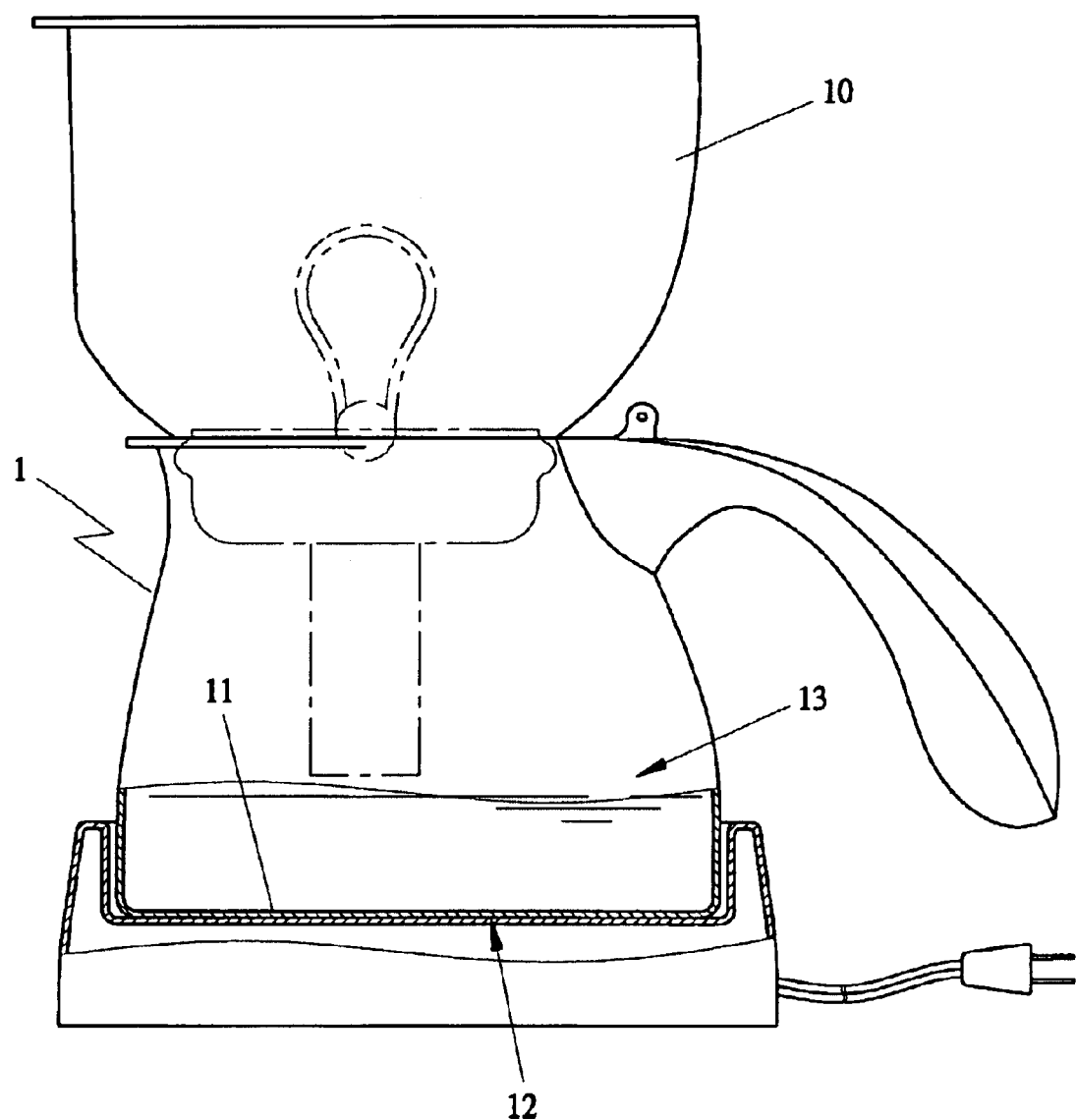
FIG. 1 is a cross-sectional view of a fourth conventional percolator.
Figure 2:
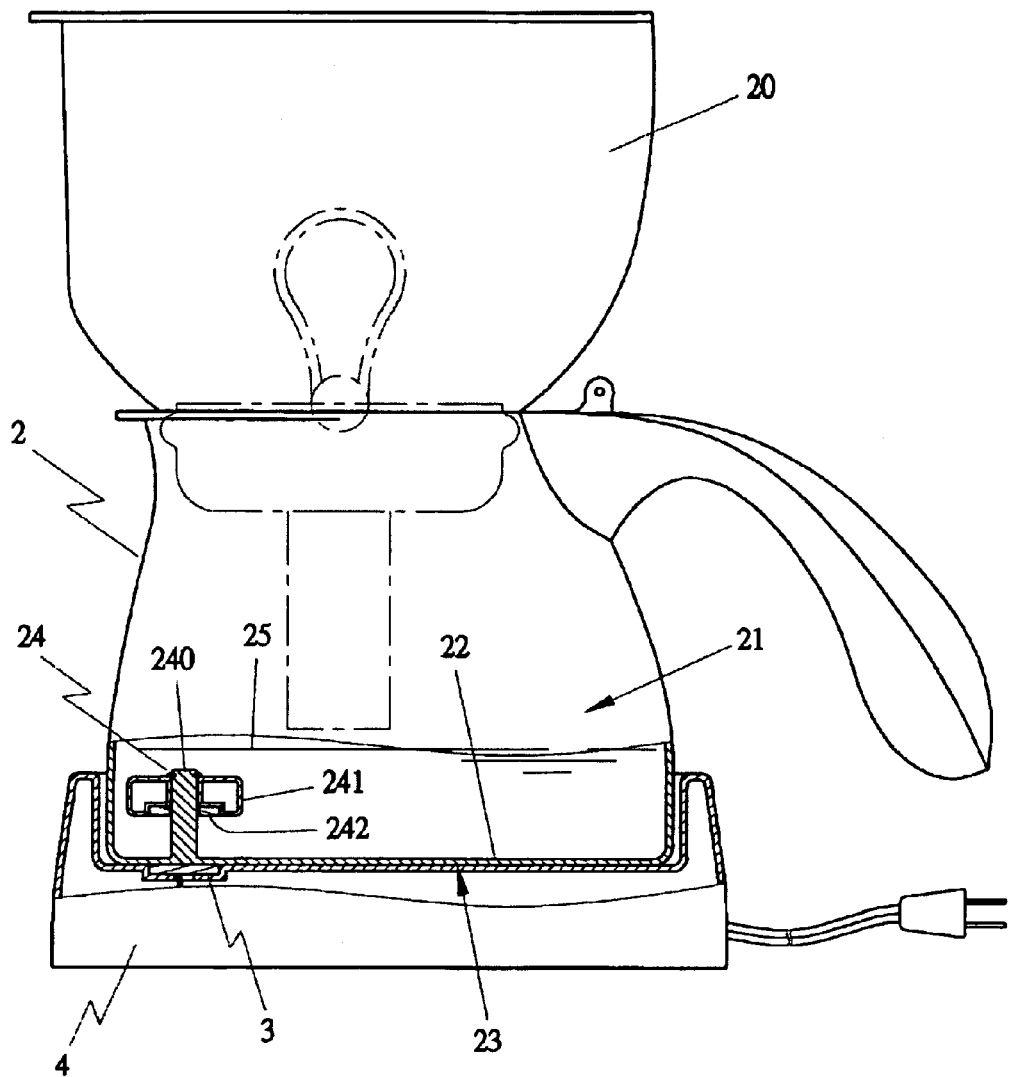
FIG. 2 is a cross-sectional view of a first preferred embodiment of a percolator in the present invention.
Figure 3:
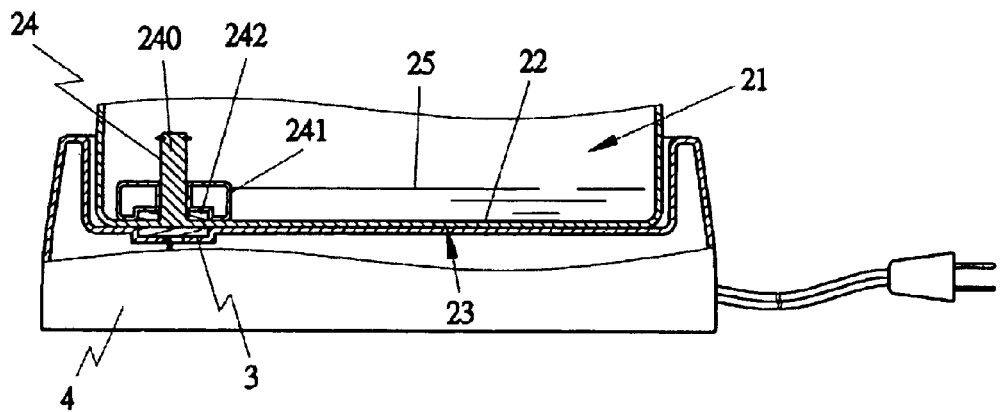
FIG. 3 is a partial cross-sectional view of the first preferred embodiment of a percolator in the present invention, showing the water level reaching a lowermost limit preset.

A first preferred embodiment of a water level detecting device for a percolator in the present invention, as shown in FIGS. 2 and 3, includes a pot body 2 and a detecting device 3.

The pot body 2 is provided with a coffee powder container on the topside and a water tank 21 in the interior. The water tank 21 is provided with a heater 23 under its bottom wall 22 and a buoy device 24 on the bottom wall 22. The buoy device 24 consists of a buoy rod 240 fitted thereon with a buoy 241 able to move upward and downward together with the height of the water level of the water tank 21. The buoy 241 is provided with a magnetic member 242.

The detecting device 3 is provided at a corresponding location of a power base 4 and the buoy device 24. A magnetic reed switch or a HALL IC can serve as the detecting device 3.

Thus, when the water level 25 of the water tank 21 reaches a lowermost limit preset, as shown in FIG. 3, the detecting device 3 will properly interact with the magnetic member 242 of the buoy 241 to disconnect the power of the power base 4 and synchronously cut off the electricity of the heater 23 of the pot body 2, enabling the percolator to cut off electricity automatically to elevate safety in use.

Figure 4:
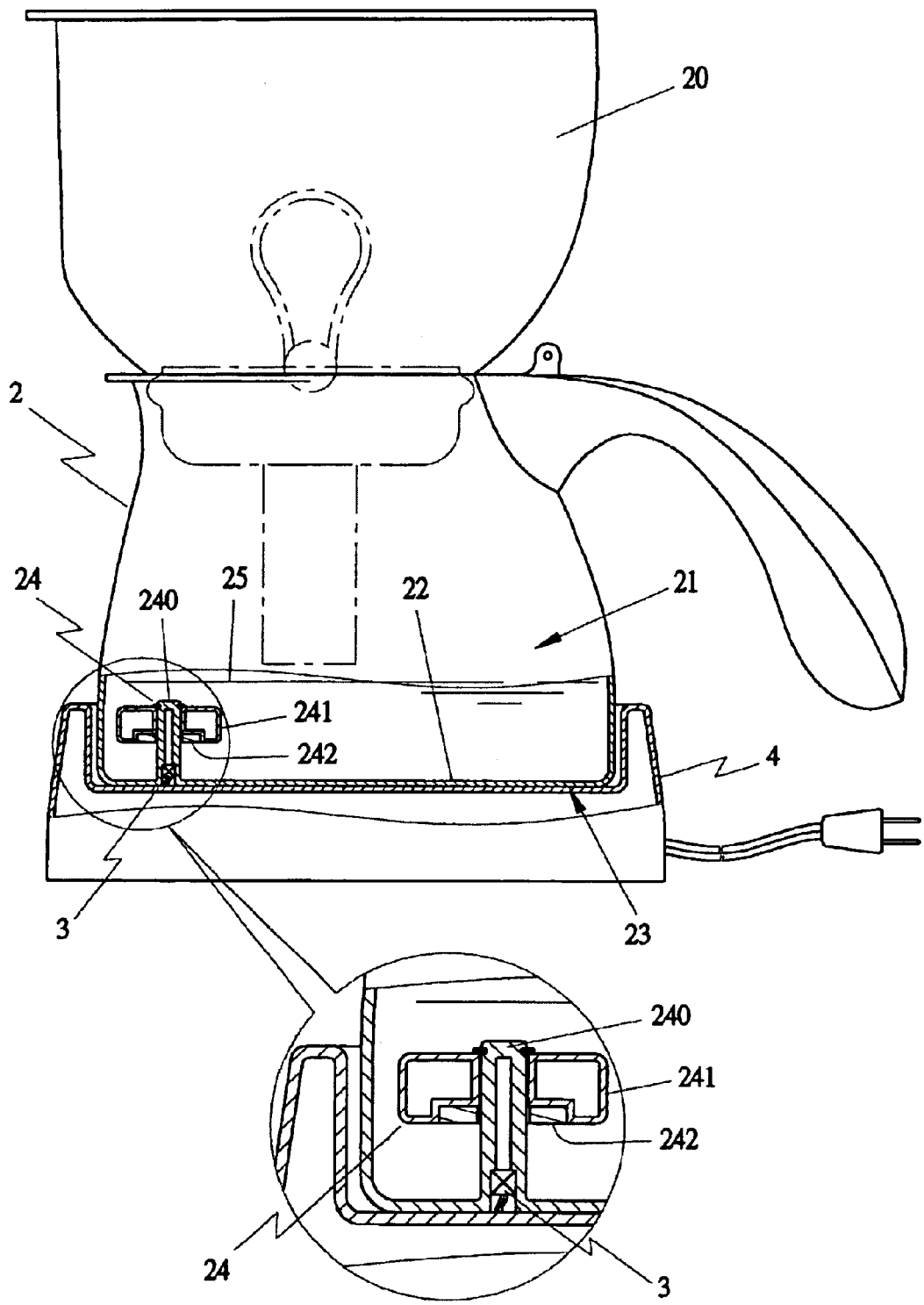
FIG. 4 is a cross-sectional and a partial magnified view of a second preferred embodiment of a percolator in the present invention.

A second preferred embodiment of a water level detecting device for a percolator in the present invention, as shown in FIG. 4, includes a pot body 2 and a detecting device 3.

The pot body 2 is provided with a coffee powder container 20 on the topside and a water tank 21 in the interior. The water tank 21 is provided with a heater 23 under its bottom wall 22 and a buoy device 24 is provided on the bottom wall 22. The buoy device 24 is provided with a buoy rod 240 fitted thereon with a buoy 241 able to move upward or downward together with the height of the water level of the water reservoir 21. The buoy 241 is provided with a magnetic member 242.

The detecting device 3 is installed inside the buoy rod 240, corresponding to the buoy device 24. A magnetic switch or a HALL IC can serve as the detecting device 3.

Thus, when the water level 25 of the water reservoir 21 reaches a lowermost limit set in advance, as shown in FIG. 3, the detecting device 3 will properly interact with the magnetic member 242 of the buoy 241 to disconnect the power of the power base 4 and simultaneously cut off the electricity to the heater 23 of the pot body 2, enabling the percolator to cut off electricity automatically to enhance safety in use.

Figure 5:
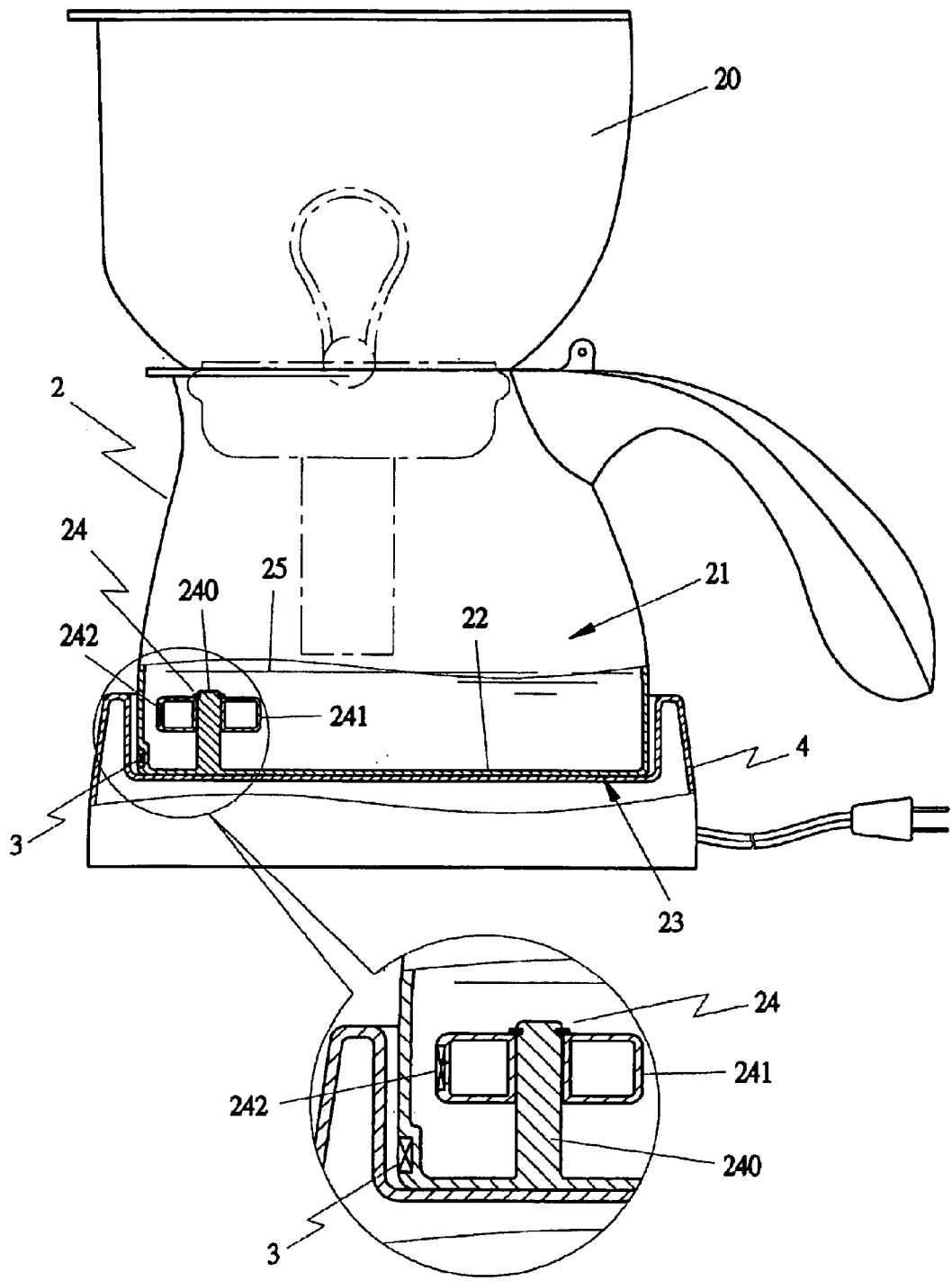
FIG. 5 is a cross-sectional and a partial magnified view of a third preferred embodiment of a percolator in the present invention.

A third preferred embodiment of a water level detecting device for a percolator in the present invention, as shown in FIG. 5, includes a pot body 2 and a detecting device 3.

The pot body 2 is provided with a coffee powder container 20 on the topside and a water tank 21 in the interior. The water tank 21 has a heater 23 provided under its bottom wall 22 and a buoy device 24 installed on the bottom wall 22. The buoy device 24 is provided with a buoy rod 240 fitted thereon with a buoy 241 able to move upward or downward together with the height of the water level of the water tank 21. The buoy 241 is provided with a magnetic member 242.

The detecting device 3 is installed on the outer wall of the pot body 2, facing the buoy device 24. A magnetic reed switch or a HALL IC can serve as the detecting device 3.

Thus, when the water level 25 of the water tank 21 reaches a lowermost limit set beforehand, as shown in FIG. 3, the detecting device 3 will properly interact with the magnetic member 242 of the buoy 241 to disconnect the power of the power base 4 and synchronously cut off the electricity of the heater 23 of the pot body 2, making the percolator cut off electrically and automatically to enhance safety in use.

Figure 6:
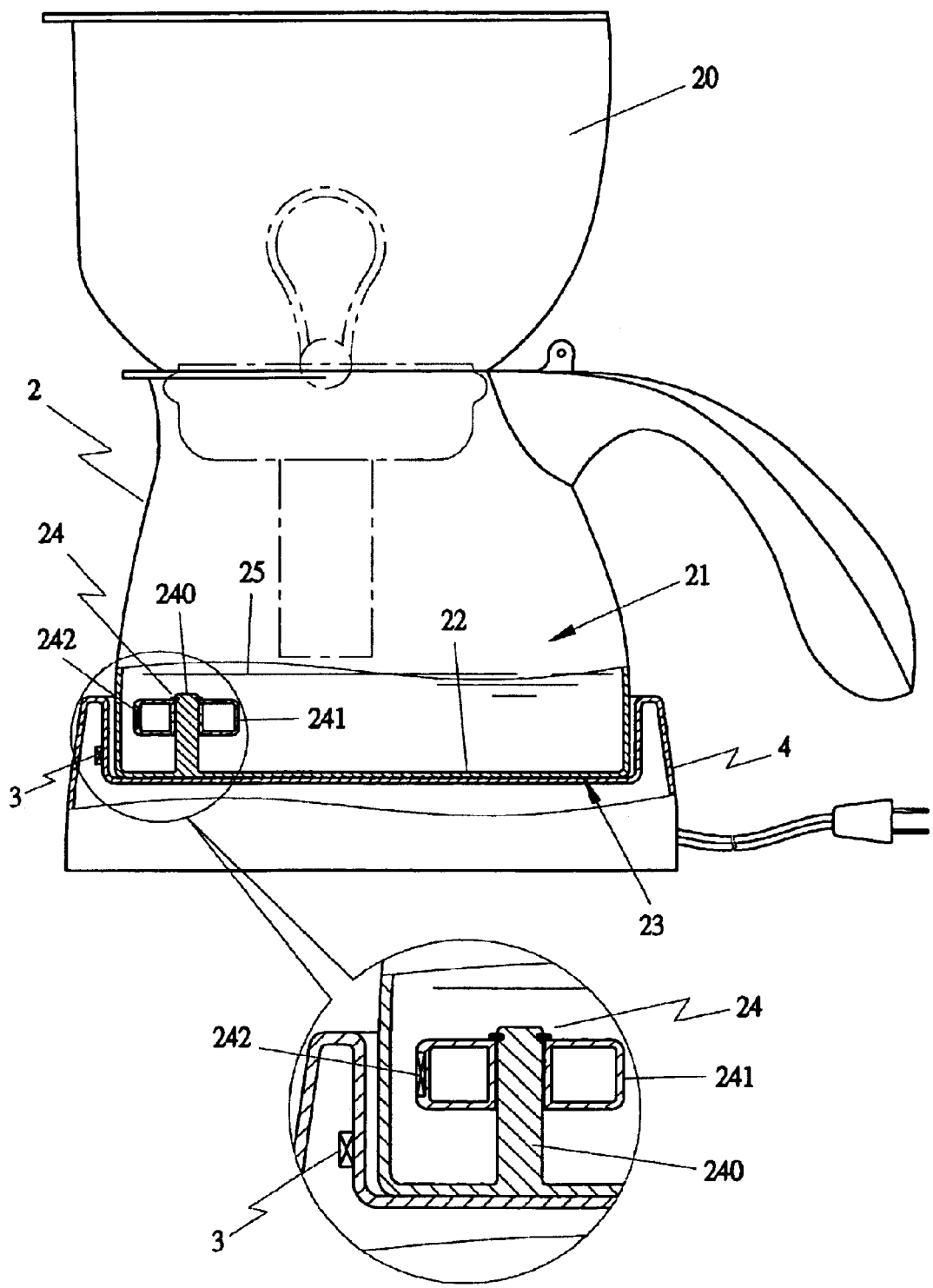
FIG. 6 is a cross-sectional and a partial magnified view of a fourth preferred embodiment of a percolator in the present invention.

A fourth preferred embodiment of a water level detecting device for a percolator in the present invention, as shown in FIG. 6, includes a pot body 2 and a detecting device 3.

The pot body 2 has a coffee powder container 20 provided on the topside and a water tank 21 formed in the interior. The water tank 21 is provided with a heater 23 under the bottom wall 22 and a buoy device 24 is installed on the bottom wall 22. The buoy device 24 is provided with a buoy rod 240 fitted thereon with a buoy 241 able to move upward or downward together with the height of the water level of the water tank 21. The buoy 241 is provided with a magnetic member 242.

The detecting device 3 is provided at the corresponding location of the power base 4 and the buoy device 24. A magnetic reed switch or a HALL IC can serve as the detecting device 3.

Thus, when the water level 25 of the water tank 21 reaches a lowermost limit set in advance, as shown in FIG. 3, the detecting device 3 will interact with the magnetic member 242 of the buoy 241 to disconnect the power of the power base 4 and synchronously cut off the electricity of the heater 23 of the pot body 2, enabling the percolator to disconnect electrically and automatically to ensure safety in use.

Figure 7:
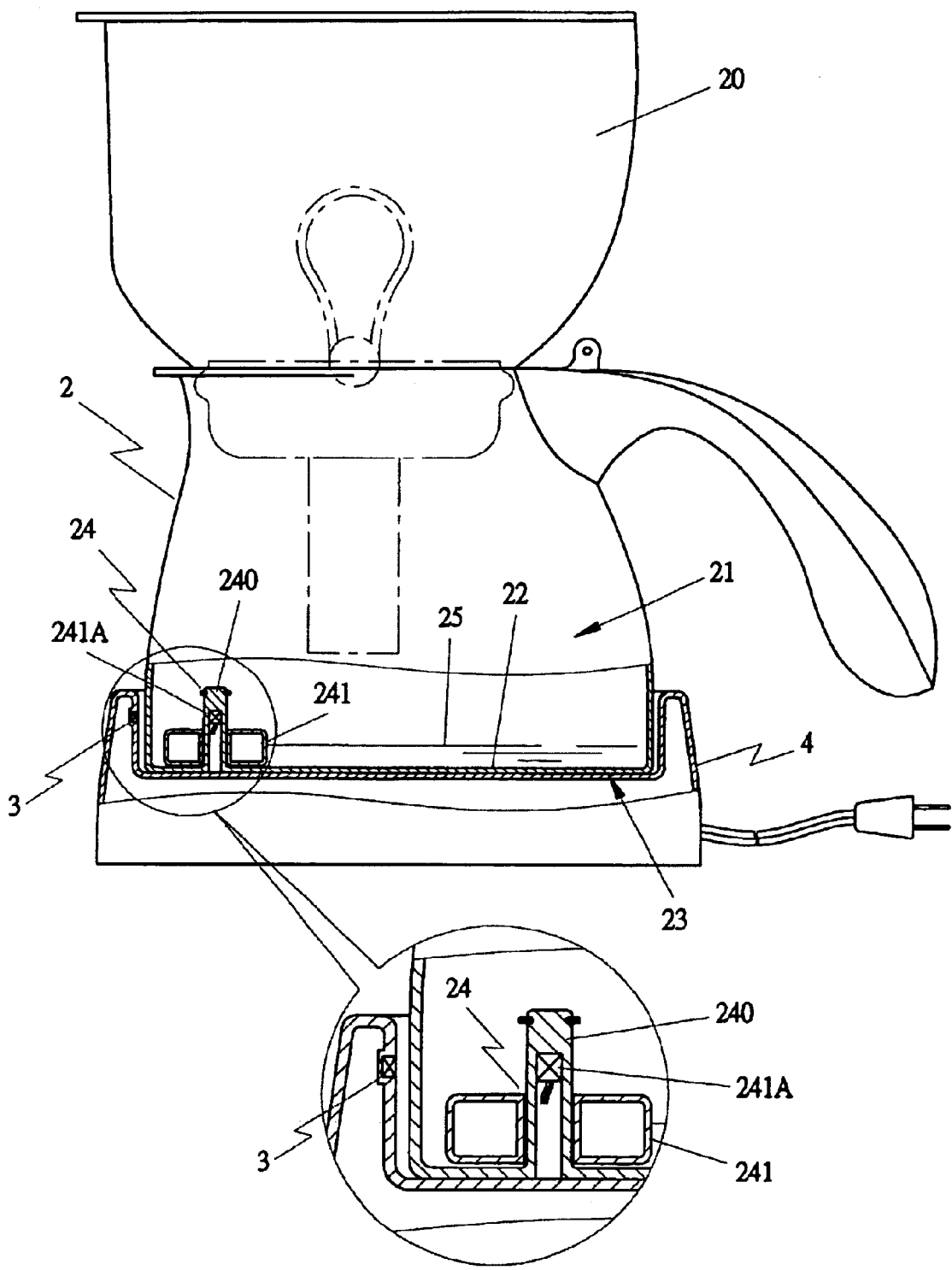
FIG. 7 is a cross-sectional and a partial magnified view of a fifth preferred embodiment of a percolator in the present invention.

A fifth preferred embodiment of a water level detecting device for a percolator in the present invention, as shown in FIG. 7, includes a pot body 2 and a detecting device 3.

The pot body 2 has a coffee powder container 20 assembled on its topside and a water tank 21 formed in the interior. The water tank 21 is provided with a heater 23 under the bottom wall 22 and a buoy device 24 is positioned on the bottom wall 22. The buoy device 24 is provided with a buoy rod 240 fitted thereon with a buoy 241 able to move upward or downward together with the height of the water level 25 of the water tank 21.

The detecting device 3 is positioned at the corresponding location of the power base 4 and of the buoy device 24. A photoelectric element, such as a ultra-red ray emitting/receiving element or a light sensitive resistor or a photoelectric transistor, can serve as the detecting device 3. In addition, the buoy rod 240 is provided in the interior with a receiving or emitting element 241A, while the power base 4 is provided with the receiving or emitting element of the detecting device 3.

Thus, when the water level 25 of the water reservoir 21 reaches a lowermost limit preset, the detecting device 3, which is now not blocked by the buoy 241, will have its receiving or emitting element interacting with the receiving or emitting element 241A in the buoy rod 240 to disconnect the power of the power base 4 and synchronously cut off the electricity of the heater 23 of the pot body 2, enabling the percolator to cut off electricity automatically to enhance safety in use.

Figure 8:
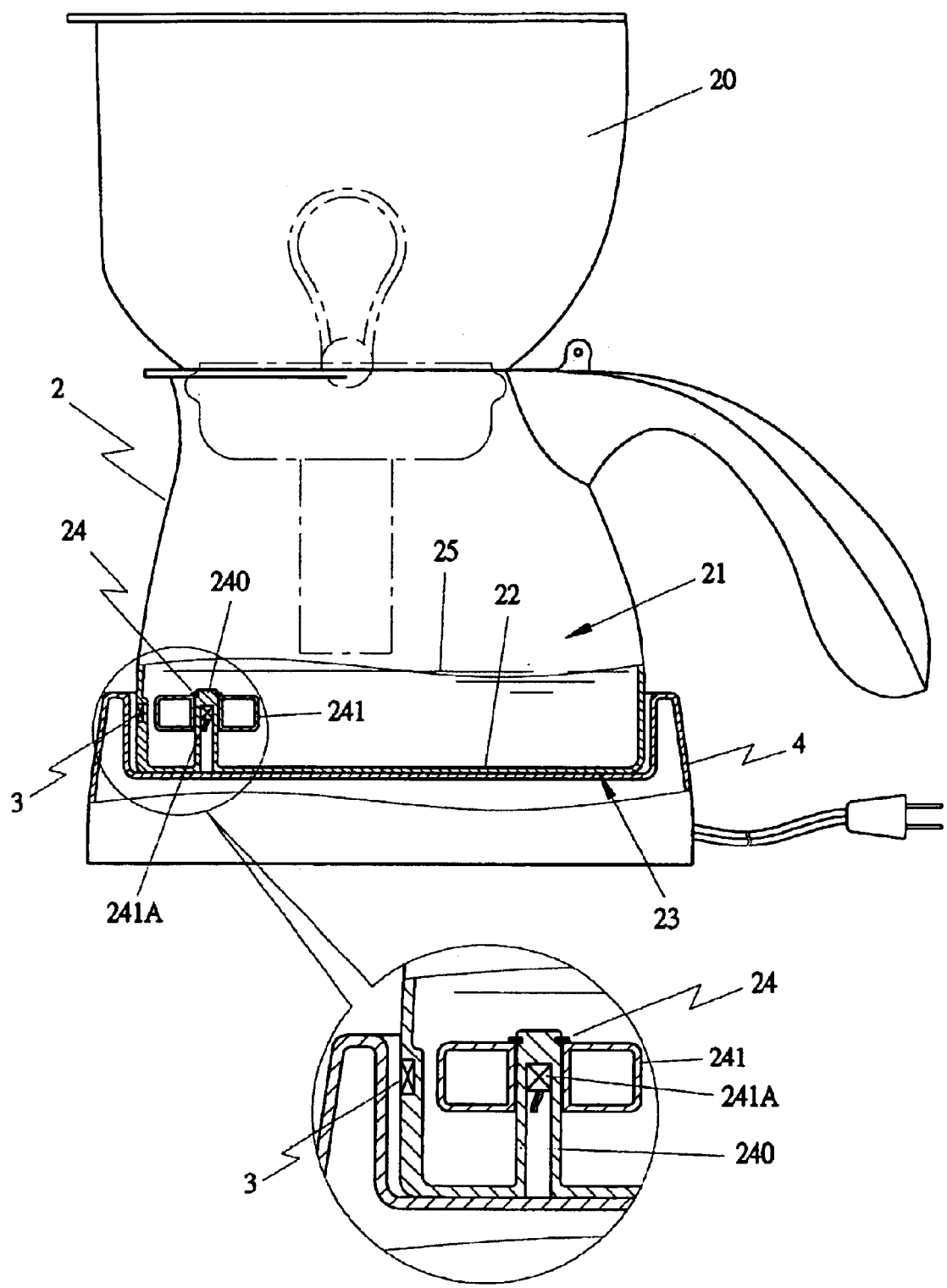
FIG. 8 is a cross-sectional and a partial magnified view of a sixth preferred embodiment of a percolator in the present invention.

A sixth preferred embodiment of a water level detecting device for a percolator in the present invention, as shown in FIG. 8, includes a pot body 2 and a detecting device 3.

The pot body 2 has a coffee powder container 20 assembled on its topside and a water tank 21 formed in the interior. The water tank 21 is provided with a heated 23 under the bottom wall 22 and a buoy device 24 is installed on the bottom wall 22. The buoy device 24 is provided with a buoy rod 240 fitted thereon with a buoy 241 able to move upward or downward together with the height of the water level 25 of the water tank 21.

The detecting device 3 is positioned on the outer wall of the pot body 2 to face the buoy device 24. A photoelectric element, a light sensitive resistor or a photoelectric transistor can serve as the detecting device 3. In addition, the buoy rod 240 is provided with a receiving or emitting element 241 A in the interior, while the power base 4 is provided with the receiving or emitting element of the detecting device 3.

Thus, when the water level 25 of the water reservoir 21 reaches a lowermost limit preset, the detecting device 3, which is now not blocked by the buoy 241, will have its receiving or emitting element interacting with the receiving or emitting element 241 A in the buoy rod 240 to disconnect the power of the power base 4 and simultaneously cut off the electricity of the heater 23 of the pot body 2, enabling the percolator to cut off electricity automatically to prevent it from burned idly to enhance safety in use.

While the preferred embodiments of the invention have been described above, it will be recognized and understood that various modifications may be made therein and the appended claims are intended to cover all such modifications that may fall within the spirit and scope of the invention.

What is claims is:

1. A water level detecting device for a percolator, said device comprising:
    a pot body having a coffee powder container assembled on the topside, said pot body provided with a buoy device in the interior, said buoy device provided with a buoy rod, said buoy rod having a buoy fitted thereon, said buoy provided with a magnetic member:
    a detecting device installed at the corresponding location of a power base and of said buoy device, a magnetic induction element serving as said detecting device: and
    said buoy in said pot body able to move upward and downward together with the height of the water level of a water tank of said pot body, said detecting device interacting with said buoy to disconnect the electricity of the heater of said pot body when the water level of said water tank reaches a lowermost limit preset, said percolator thus able to cut off electricity automatically to ensure safety in use.

2. The water level detecting device for a percolator as claimed in claim 1, wherein said detecting device is positioned on the outer wall of said pot body.

3. The water level detecting device for a percolator as claimed in claim 1, wherein said detecting device is positioned in said buoy rod of said buoy device.

4. The water level detecting device for a percolator as claimed in claim 1, wherein the magnetic induction element of said detecting device is a magnetic reed switch.

5. The water level detecting device for a percolator as claimed in claim 1, wherein said magnetic induction element of said detecting device is a HALL IC.

6. The water level detecting device for a percolator as claimed in claim 1, wherein a water level sensing element and a temperature fuse are provided under a heating board.

7. A water level detecting device for a percolator comprising:
    a pot body having a coffee powder container assembled on the topside, said pot body provided with a buoy device in the interior, said buoy device provided with a buoy rod, said buoy rod having a buoy fitted thereon, said buoy rod provided with an emitting or receiving element in the interior:
    a detecting device installed at the opposite position of said power base and of said buoy device, a photoelectric element serving as said detecting device: and,
    said buoy in said pot body able to move upward and downward together with the height of the water level of a water tank of said pot body, said detecting device interacting with said buoy to cut off the electricity of the heater of said pot body when the water level of said water tank reaches a lowermost limit preset, said percolator thus able to cut off electricity automatically to enhance safety in use.

8. The water level detecting device for a percolator as claimed in claim 7, wherein said detecting device is installed on the outer wall of said pot body.

9. The water level detecting device for a percolator as claimed in claim 7, wherein said photoelectric element of said detecting device is a ultra-red ray emitting/receiving element.

10. The water level detecting device for a percolator as claimed in claim 7, wherein said photoelectric element of said detecting device is a photoelectric transistor.

11. The water level detecting device for a percolator as claimed in claim 7, wherein said photoelectric element of said detecting device is a light sensitive resistor.

* * * * *